United States Patent [19]

Ferro

[11] 4,219,760
[45] Aug. 26, 1980

[54] SEF LAMP DIMMING

[75] Inventor: Armand P. Ferro, Schenectady, N.Y.

[73] Assignee: General Electric Company, Schenectady, N.Y.

[21] Appl. No.: 22,938

[22] Filed: Mar. 22, 1979

[51] Int. Cl.² .......................................... H05B 41/392
[52] U.S. Cl. ..................................... 315/248; 315/57; 315/DIG. 4
[58] Field of Search ..................... 315/248, 57, DIG. 4

[56] References Cited
U.S. PATENT DOCUMENTS

| | | | |
|---|---|---|---|
| 4,117,378 | 9/1978 | Glascock | 315/248 |
| 4,128,785 | 12/1978 | Ferro et al. | 315/248 X |

Primary Examiner—Alfred E. Smith
Assistant Examiner—Charles F. Roberts
Attorney, Agent, or Firm—Alexander M. Gerasimow; James C. Davis; Marvin Snyder

[57] ABSTRACT

Solenoidal electric field lamps are effectively dimmed with no loss in lamp efficiency by powering the lamps with high frequency current pulses and periodically interrupting the current pulses in a time ratio fashion in order to reduce the average power being supplied to the lamp. The lamp may be dimmed from 100 to 0 percent of full power in an efficient manner as long as the pulse interruption period is less than the plasma deionization time of the lamp.

6 Claims, 3 Drawing Figures

SEF LAMP DIMMING

BACKGROUND OF THE INVENTION

This invention relates to solenoidal electric field (SEF) lamps and in particular to a method and apparatus for dimming SEF lamps.

SEF lamps are efficient, fluorescent type lamps configured and operated in a fashion so as to serve as replacements for conventional incandescent lamps which operate at low energy efficiencies; in particular, an energy efficiency for an incandescent lamp of 15 lumens per watt is typical while the energy efficiency of SEF lamps can exceed 50 lumens/watts. Moreover, incandescent lamps exhibit a relatively short life time even when compared to conventional tubular fluorescent lamps. However, SEF lamps are efficient and long lived. Such SEF lamps are described, for example, in U.S. Pat. No. 4,128,785 issued to Ferro et al. and in U.S. Pat. No. 4,117,378 issued to Glascock, both of which are incorporated herein as background material. While these SEF lamps are efficient and long lived, up until now there has been no effective way to dim these lamps without deleteriously affecting the lamp efficiency. Since lamp dimming is both an aesthetically desirable feature and since it can also result in energy saving through reduced power consumption, it is very desirable that SEF lamps operate in this manner.

All SEF lamps contain an ionizable medium through which an electrical current flows. This ionizable medium exhibits a negative resistance characteristic, that is to say, as the discharge current through the plasma increases, the voltage drop along the discharge path increases. Thus, lowering the peak currents in SEF lamps results in an increased operating voltage which causes a corresponding increase, in a near cubic fashion in the flux density in the toroidal core of the lamp. This results in excessive core losses, reduced efficiency, and it increases the possibility that the Curie temperature of the core is exceeded. Likewise, dimming based on the use of full or half-wave rectified sinusoidal currents is not efficacious since SEF lamps will not turn on until well into the current cycle, particularly for lamps operating at a high power factor. When such lamps are running at high power factor, lamp voltage is changing from peak value to zero during the "on" portion of the lamp cycle and thus sinusoidal frequency is decreasing through each of these same peak currents. Such a lamp inherently turns off at some arbitrary time when the applied voltage is less than the reflected lamp voltage. To achieve a given average power level, instantaneous or cycle-to-cycle power levels must be considerably higher during early portions of the cycle. Since lamp and ballast inefficiencies result, it is desirable to run at a constant power level which means low power factor operation. Thus, in low power factor lamp operation, the only method of reducing power to the lamp is to reduce the peak or RMS current levels; however, as seen above, this results in core heating and inefficiency, and additionally, results in plasma saturation which results in an approximately 12 percent decrease in efficiency. Also, dimming in SEF lamps operating at high power factor with sinusoidal waveforms results in lack of full lamp control and lowered efficiency. While low power factor operation is preferred to high power factor operation, dimming in a low power factor mode is inefficient with conventional dimming methods, and accordingly, the present invention alleviates this problem.

SUMMARY OF THE INVENTION

In accordance with the preferred embodiment of the invention, an SEF lamp is effectively dimmed by powering the lamp with substantially constant current pulses at a first, relatively high frequency which pulses are repeatedly interrupted at a lower frequency in a time ratio fashion to effect a reduction in the time averaged power being supplied to the lamp. The frequency of interruption is preferably chosen to be such that plasma deionization does not occur between successive pulse burst applications. In this way, then, restarting of the lamp is readily accomplished. This method of operating an SEF lamp is usable with any inverter which can be made to turn on and off in response to a control signal and hence is applicable to all inverters conventionally employed for the effective ballasting of SEF lamps. The modulation frequency is also chosen with consideration for audio frequency resonances which may occur, for example, in the lamp ferrite. Minimum acoustic noise is a desired feature and frequency selection should be responsive to this goal.

DETAILED DESCRIPTION OF THE INVENTION

Figure 1:
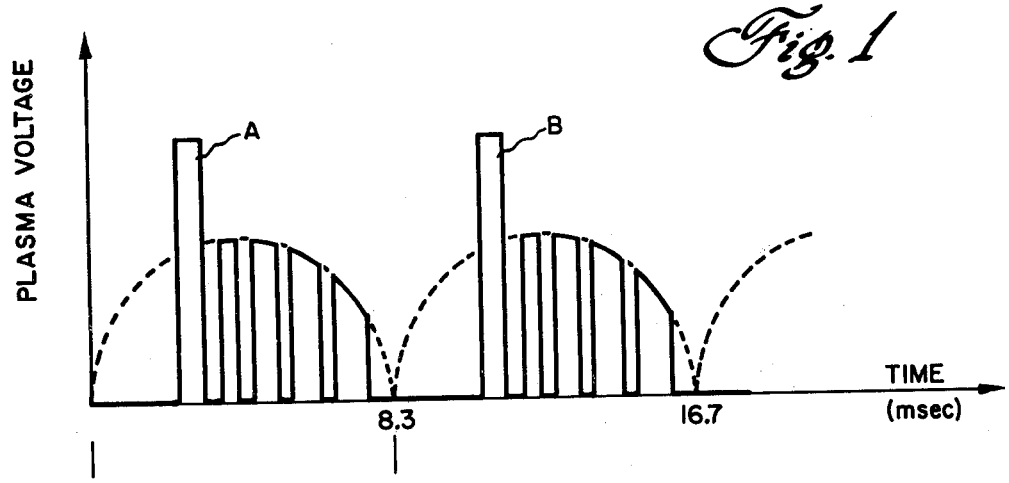
FIG. 1 is a plot of lamp voltage versus time illustrating sinusoidal excitation in high power factor SEF lamps.

FIG. 1 illustrates a conventional lamp voltage waveform associated with dimming techniques derived from modification of a a full-wave rectified sinusoidal power source. The full wave rectified aspects of this waveform are derived from the conventional 60 Hz line current. As indicated above, the lamp voltage illustrated in FIG. 1 indicates a dimming modality for an SEF lamp being operated at a high power factor. Restart pulses A and B are delayed until a significant portion of the cycle is completed. If this were not done there would be insufficient voltage to run the lamp following restart pulses. Thus, effective control of a significant portion of the lamp operating cycle is lost. Additionally, as indicated above, the frequency decreases in order for the same peak currents to be reached. Under these operating conditions, the lamp inherently turns off at arbitrary times. Again, full lamp power control is not possible.

Figure 2:
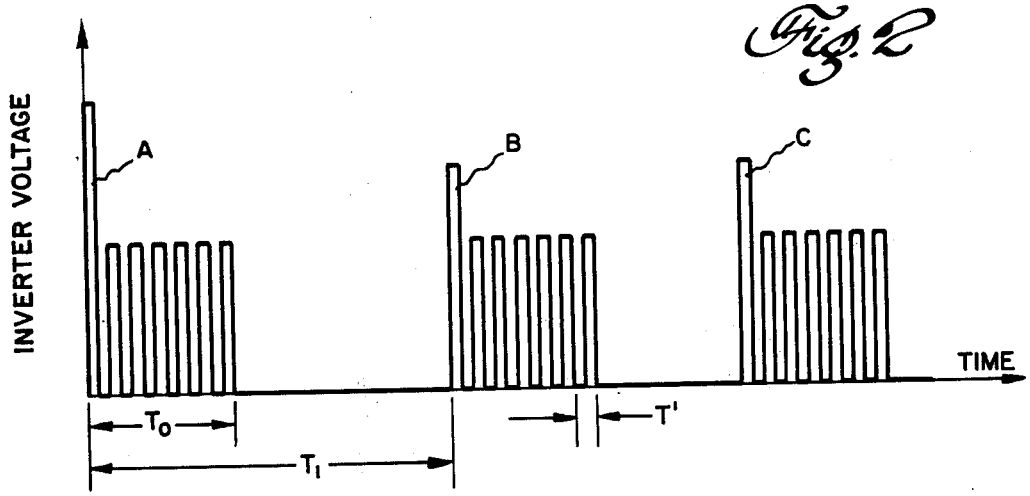
FIG. 2 is a plot of inverter output voltage versus time in accordance with the preferred embodiment of the present invention.

FIG. 2 illustrates the voltage applied to an SEF lamp in the present invention. In accordance therewith, current pulses having a period T' are applied in varying width bursts to the lamp. The pulse frequency, 1/T', is typically in excess of 25 KHz for acoustic reasons but may be less than this for range control reasons. These pulses are periodically interrupted and then restarted. The time period $T_1$ represents the interval between successive restarts of the pulses which have frequency 1/T'. As indicated in FIG. 2, the time period $T_0$ represents that time during which the current pulses are being applied to the lamp. The fraction $T_0/T_1$ represents the duty cycle and thus by varying the quantity $T_0$ between 0 and $T_1$, the average power being supplied to the lamp can be made to vary between 0 and 100 percent of full power, respectively. The time period for which no power is supplied to the lamp, namely, $T_1$-$T_0$, is preferably less than the plasma deionization period of the ionizable medium contained in the SEF lamp. Of necessity, then, as shown in FIG. 2, $T_0$ is less than or equal to $T_1$ and $T'$ is less than $T_1$ typically by at least one order of magnitude. The greater the difference between $T'$ and $T_1$, the greater is the resolution with which the lamp may be dimmed. In FIG. 2, starting pulse A is typically slightly larger than restarting pulses B and C particularly if the quantity $T_1$-$T_0$ is significantly less than the plasma deionization period. With the powering waveform of FIG. 2, control over the average power being applied to the lamp may be easily controlled from small values based on the operating frequency to 100 percent power. The current pulses being supplied to the lamp are substantially constant and there is no concern that the lamp will turn off prematurely nor are there wasted portions of the powering cycle during which control is not possible. Likewise, the power waveform in FIG. 2 does not promote saturation and overheating of the ferrite nor the saturation of the plasma with which there is associated a corresponding drop in efficiency. The waveform shown in FIG. 2 is particularly applicable in SEF lamps operating at low power factor where current is being provided in more or less continuous pulses. Thus, the lamp of the present invention while being operated in a dimmed mode is operating on a portion of the power curve during which the current is high and the voltage is low. This relatively low operating voltage modality results in little excess core heating or plasma saturation. These concerns are not present in conventional fluorescent lamps since there is no concern if the voltage does in fact increase as the current is reduced. As is obvious, there are alternative ways to adjust the time periods, depending on the details of the circuit chosen.

Figure 3:
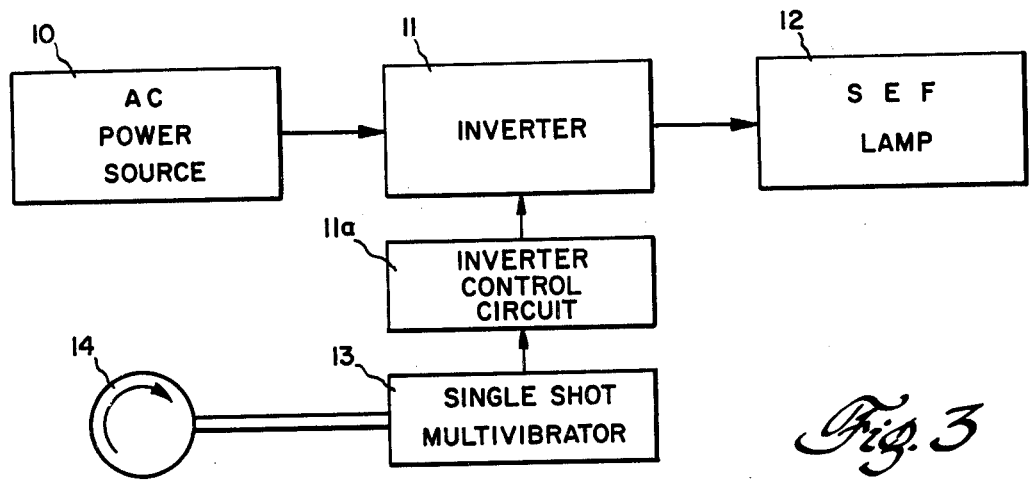
FIG. 3 is a schematic diagram illustrating the block diagram of a circuit for dimming SEF lamps in accordance with the present invention.

FIG. 3 shows a schematic block diagram of a circuit for implementing the present invention. Inverter 11 powered from a conventional alternating current power source produces pulses having a frequency $1/T'$. The output of a single shot multivibrator 13 may be used to turn the inverter on and off through control circuitry 11a. The actual circuits to accomplish this are easily fabricated using standard low voltage integrated circuit components and the circuit details are not shown. Basically, the inverter 11 may be a standard integrated circuit inverter such as a peak current controlled inverter which is typically started by triggering a thyristor switch to shift charges into one of the inverter power transistors. Inverter turn-off may be accomplished by effectively grounding the base of one of the control transistors to inhibit running of the inverter. This control is easily accomplished through the signals provided by a single shot multivibrator 13 which produces signal control pulses having a period $T_1$ and operating with a duty cycle $T_0/T_1$. The duty cycle, depending directly on $T_0$ is determined by means of control 14 which typically comprises a device such as a slide or rotary potentiometer. The output of the inverter, thus controlled, is applied to the SEF lamp 12.

By way of example, and not limitation, an SEF lamp constructed in accordance with the present invention is readily dimmable without loss in efficiency as seen in the Table below in which the first column is the lamp voltage, the second column is the lamp current, the third column is the average power being supplied to the lamp, the fourth column is the lumen output of the lamp, and the fifth column is the efficiency in lumens per watt:

Table

| Volts | Amps | Power (watts) | Lumens | Efficiency Lumens/watt |
|---|---|---|---|---|
| 120 | 0.59 | 40 | 2048 | 51.2 |
| 120 | 0.20 | 11.8 | 609 | 51.6 |
| 119.7 | 0.338 | 19.9 | 1036 | 52.1 |
| 119.4 | 0.482 | 29.9 | 1553 | 51.9 |

The lamp described in the table above operates at a power factor corresponding to a phase angle between the current and voltage of approximately 56°. It is thus seen that the lamp can be efficiently dimmed from a light output of 2048 lumens to 609 lumens without any decrease in lamp efficiency.

From the above, it may be appreciated that the method and apparatus of the present invention permit the construction and operation of a dimmable SEF lamp so as to provide an efficient replacement for the incandescent lamp which also incorporates an aesthetically pleasing and energy saving dimming feature. This feature for an SEF lamp satisfactorily overcomes the problems associated with conventional dimming techniques such as current reduction which results in excess core heating and potential lamp failure.

While this invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:

1. A method of dimming an SEF lamp comprising:
    applying current pulses to said lamp at a first frequency, $1/T'$, and repeatedly interrupting said current pulses every $1/T_1$ seconds, said interruption lasting for a time, $T_1$-$T_0$ seconds where $T'$ is less than $T_1$ and $T_0$ is no greater than $T_1$.
2. The method fo claim 1 in which $1/T'$ is greater than 25 KHz.
3. The method of claim 2 in which $T_1$-$T_0$ is less than the plasma deionization period.
4. A dimmable SEF lamp apparatus comprising:
    an SEF lamp including an evacuable, light-transmissive phosphor coated envelope containing an ionizable medium which is electromagnetically coupled through a toroidal ferrite core which is coupled to a source of radio frequency current pulses operating at a first frequency, $1/T'$; and
    means for interrupting said current pulses every $1/T_1$ seconds for a time $T_1$-$T_0$ seconds where $T'$ is less than $T_1$ and $T_0$ is no greater than $T_1$.
5. The apparatus of claim 4 in which $1/T_1$ is greater than 25 KHz.
6. The apparatus of claim 5 in which $T_1$-$T_0$ is less than the plasma deionization period.

* * * * *